US008340814B2

(12) United States Patent
Hamilton

(10) Patent No.: US 8,340,814 B2
(45) Date of Patent: Dec. 25, 2012

(54) SYSTEM AND METHOD FOR TRACKING OF MAIL USING A UNIVERSAL CODING SYSTEM

(75) Inventor: Daryl Hamilton, Hyattsville, MD (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 13/215,673

(22) Filed: Aug. 23, 2011

(65) Prior Publication Data
US 2012/0004765 A1 Jan. 5, 2012

Related U.S. Application Data

(63) Continuation of application No. 10/817,574, filed on Apr. 2, 2004, now Pat. No. 8,005,568.

(60) Provisional application No. 60/460,449, filed on Apr. 4, 2003.

(51) Int. Cl.
*G06F 7/00* (2006.01)
*G06Q 10/00* (2012.01)
*G06Q 20/00* (2012.01)

(52) U.S. Cl. .......... 700/225; 700/215; 700/229; 705/22; 705/28; 705/333

(58) Field of Classification Search .................. None
See application file for complete search history.

(56) References Cited

U.S. PATENT DOCUMENTS

| | | | |
|---|---|---|---|
| 4,097,923 A | 6/1978 | Eckert et al. | |
| 5,216,620 A * | 6/1993 | Sansone | 700/224 |
| 5,319,562 A * | 6/1994 | Whitehouse | 705/403 |
| 5,420,403 A * | 5/1995 | Allum et al. | 235/375 |
| 6,148,291 A * | 11/2000 | Radican | 705/28 |
| 6,208,910 B1 * | 3/2001 | Michael et al. | 700/225 |
| 6,445,297 B1 * | 9/2002 | Nicholson | 340/572.7 |
| 6,549,892 B1 * | 4/2003 | Sansone | 705/401 |
| 6,610,954 B2 | 8/2003 | Takizawa | |
| 6,701,217 B1 * | 3/2004 | Sansone | 700/227 |
| 6,724,308 B2 * | 4/2004 | Nicholson | 340/572.1 |
| 6,746,164 B1 | 6/2004 | Albright et al. | |
| 6,801,833 B2 * | 10/2004 | Pintsov et al. | 700/223 |
| 7,284,699 B2 * | 10/2007 | Hamilton | 235/385 |
| 7,364,079 B2 * | 4/2008 | Raney et al. | 235/462.01 |

(Continued)

FOREIGN PATENT DOCUMENTS
WO  WO 2004/095225  11/2004

OTHER PUBLICATIONS

PCT International Search Report and Written Opinion in PCT/US04/07705, mailed Sep. 13, 2007, 10 pages.

(Continued)

*Primary Examiner* — Ryan Zeender
*Assistant Examiner* — Dana Amsdell
(74) *Attorney, Agent, or Firm* — Finnegan, Henderson, Farabow, Garett & Dunner, LLP

(57) ABSTRACT

A method of tracking trays through a delivery system. The method comprises: generating an enhanced label, the enhanced label comprising a routing code and a label unique identifier, the enhanced label being applied to the tray; associating a tray with a container, the container having a container unique identifier; and receiving a load container scan, the load container scan associating the container unique identifier with the enhanced label.

19 Claims, 11 Drawing Sheets

U.S. PATENT DOCUMENTS

| | | | |
|---|---|---|---|
| 8,005,568 B2* | 8/2011 | Hamilton | 700/225 |
| 2002/0029153 A1 | 3/2002 | Lee et al. | |
| 2002/0046196 A1* | 4/2002 | Ogg | 705/406 |
| 2002/0117429 A1* | 8/2002 | Takizawa | 209/583 |
| 2003/0083890 A1* | 5/2003 | Duncan et al. | 705/1 |
| 2003/0115162 A1* | 6/2003 | Konick | 705/404 |
| 2003/0229543 A1* | 12/2003 | Zimmerman et al. | 705/26 |
| 2004/0133438 A1* | 7/2004 | Zeisset et al. | 705/1 |
| 2005/0216119 A1* | 9/2005 | Hamilton | 700/224 |
| 2006/0108266 A1* | 5/2006 | Bowers et al. | 209/584 |
| 2008/0179225 A1* | 7/2008 | Bowers et al. | 209/584 |
| 2011/0046775 A1* | 2/2011 | Bailey et al. | 700/224 |

OTHER PUBLICATIONS

PCT International Preliminary Examination Report in PCT/US04/07705, mailed Oct. 4, 2007, 5 pages.

First Examination Report in Indian Patent Application No. 2053/KOLPN/2005, mailed Nov. 11, 2007, 5 pages.

http://excel.tips.net/Pages/T002158_Calculating_Combinations.html, 2010, 2 pages.

Office Action in Mexican Patent Application No. PA/a/2005/0106722, dated Jul. 8, 2008, 2 pages.

Office Action in Mexican Patent Application No. PA/a/2005/0106722, mailed Feb. 24, 2009, 2 pages.

Supplementary European Search Report in Application No. 04725594.8-1229/1616233, mailed Sep. 4, 2009 (three pages).

Office Action in Mexican Patent Application No. PA/a/2005/0106722, mailed Oct. 7, 2009, 3 pages.

Office Action in Chinese Application No. 200480013205.8, dated Feb. 26, 2010, 14 pages.

Office Action in European Application No. 04725594.8-1229, dated Apr. 15, 2010, 5 pages.

Office Action in Chinese Application No. 200480013205.8, dated Aug. 11, 2010, 4 pages.

Office Action in Chinese Application No. 200480013205.8, dated Nov. 22, 2010, 6 pages.

* cited by examiner

905

SYSTEM AND METHOD FOR TRACKING OF MAIL USING A UNIVERSAL CODING SYSTEM

RELATED APPLICATIONS

This patent application is a continuation application of U.S. patent application Ser. No. 10/817,574, filed Apr. 2, 2004, now U.S. Pat. No. 8,005,568, which claims the benefit of priority of U.S. Provisional Application No. 60/460,449, filed Apr. 4, 2003, the disclosures of which are incorporated herein by reference.

TECHNICAL FIELD

The invention relates to the field of delivery services, and more specifically, a system for and method of tracking and tracing mail using a universal coding strategy.

BACKGROUND

Some present mail handling systems route trays of shipping items through shipping handling systems with no tracking of the trays. For example, mail trays may be misrouted or lost with no way to easily find the location of the trays. These mail handling systems, unable to track mail trays, have limited ability to gather metrics on mail handling and distribution performance. They are thus limited in efforts to allocate operations efficiently based on expected tray flows. In particular, such mail handling systems are limited in their ability to provide tracking information on mail trays to customers who wish to know the status of their mail as it flows through the delivery system. In-transit visibility, manifest reconciliation, and automated mail acceptance are hampered by the lack of tray tracking capabilities.

There is a need for systems to provide near-real time tracking of mailings and mail trays through the distribution system. Tracking would allow for advanced debiting processes and more efficient transportation assignment. The tracking of trays is needed for resource management and allocation and the tracking of lost or mislaid trays. There is a need for a system that could find slow down points within the handling and distribution system to target areas for improvement.

The present invention is directed to overcoming one or more of the above problems and achieving one or more of the above stated goals.

SUMMARY OF THE INVENTION

A method of tracking trays through a delivery system, consistent with the present invention, comprises: generating an enhanced label, the enhanced label comprising a routing code and a label unique identifier, the enhanced label being applied to the tray; associating a tray with a container, the container having a container unique identifier; and receiving a load container scan, the load container scan associating the container unique identifier with the enhanced label.

A system for tracking a tray, comprises: a memory; a database; and a processor coupled to the memory and the database. The processor is configured to: generate an enhanced label, the enhanced label comprising a routing code and a label unique identifier, the enhanced label being applied to the tray; associate a tray with a container, the container having a container unique identifier; and receive a load container scan, the load container scan associating the container unique identifier with the enhanced label.

A computer-readable medium on which is stored a set of instructions for tracking a tray is provided. When executed the instructions perform stages comprising: generating an enhanced label, the enhanced label comprising a routing code and a label unique identifier, the enhanced label being applied to the tray; associating a tray with a container, the container having a container unique identifier; and receiving a load container scan, the load container scan associating the container unique identifier with the enhanced label.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing summary and the following detailed description are exemplary and explanatory in nature and are intended to provide further explanation of the invention as claimed.

BRIEF DESCRIPTION OF THE DRAWINGS

The accompanying drawings, which are incorporated in and constitute a part of this specification, illustrate systems and methods consistent with the invention and, together with the description, serve to explain the principles of the invention.

DETAILED DESCRIPTION

Figure 1:
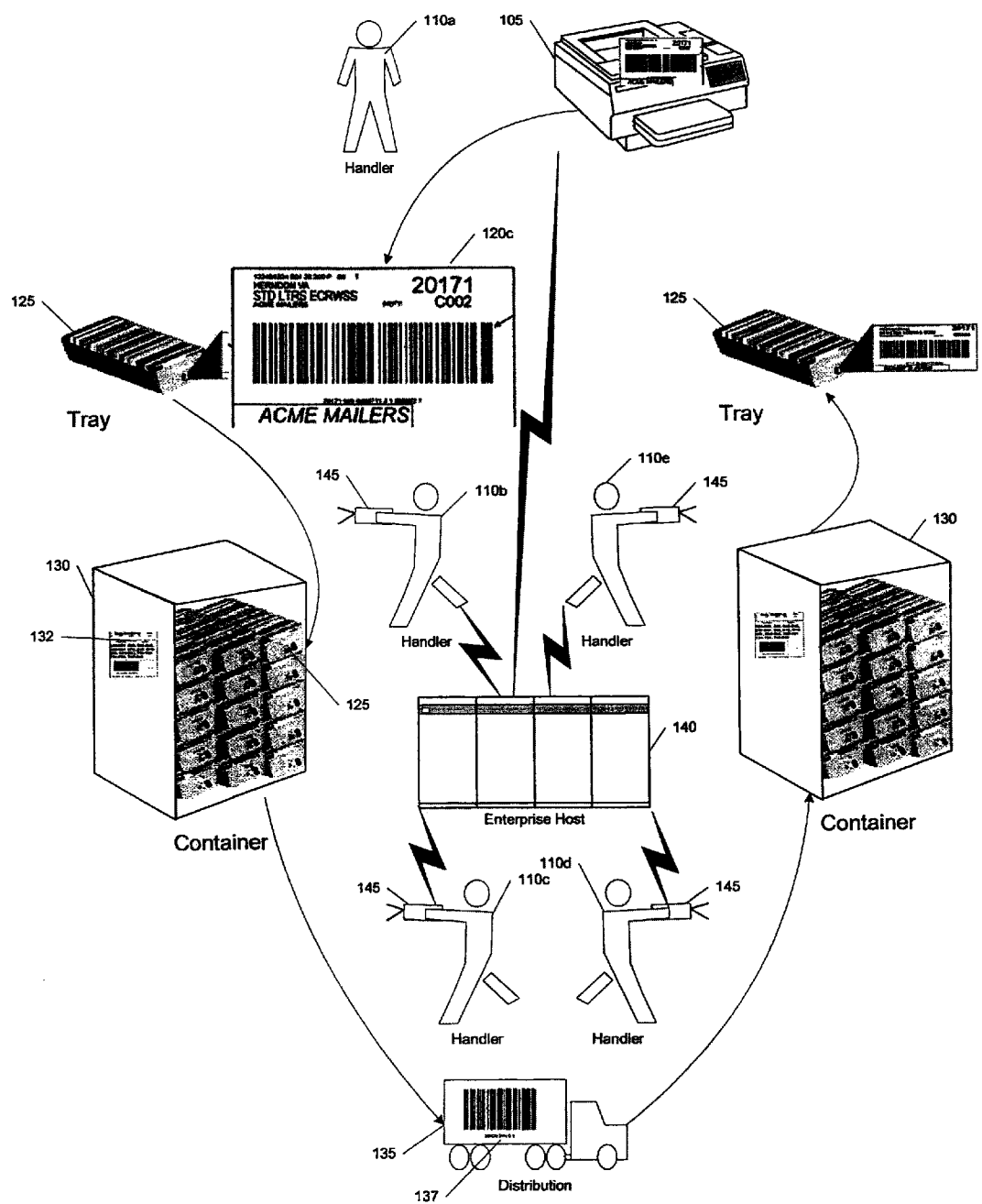
FIG. 1 is an illustration of a system consistent with the present invention in its operating environment.

Reference will now be made in detail to the present exemplary embodiments consistent with the invention, examples of which are illustrated in the accompanying drawings. Wherever possible, the same reference numbers will be used throughout the drawings to refer to the same or like parts.

A universal coding system enables tracking and tracing of shipping items throughout a shipping distribution network. To facilitate this system, the current ten-digit routing, barcoded, label ("the routing code") used within the U.S. Postal's handling and distribution system may be replaced with a unique barcode tag label. Consistent with the present invention, the routing code may be amended to include additional data elements that may not only continue to support sorting and routing, but may also establish a unique identifier on each label to enable tracking. In order to promote operational efficiencies and track containers and trayed items from acceptance to delivery, and through each handling unit, the system may receive a unique identifier without changing or negatively impacting standard operating practices.

One solution consistent with the present invention is an enhanced tray label. The enhanced label may comprise a 24-digit code, such as a bar code, which may comprise a routing code and a unique identifier. The enhanced label may provide significant tracking and financial benefits when integrated with other operations systems within the shipping distribution network. The enhanced label may provide a unique identifier for each tray, flat tub, or sack.

In one embodiment, a universal coding system consistent with the present invention may facilitate customer interaction with a postal distribution network by enabling advanced e-business capabilities provided by operations systems. These may include electronic information, documentation, payment, verification, and transportation systems. In addition, systems consistent with the present invention may provide visibility into mailings by enabling real-time verification and reconciliation of origin/destination mailings throughout the postal distribution network.

Systems consistent with the present invention may also allow advanced debiting procedures, quicker mail entry, and facilitate more efficient surface transportation assignment using electronic acceptance, verification, and payment procedures. Such systems may also provide real-time information to improve service through better business decisions and resource management (e.g., advanced volume forecasting, resolving sources of misrouted mail). Universal coding systems may also provide real-time information systems that would allow plants, customers, and transportation planners to use available information to dynamically optimize the allocation of resources. In addition, systems consistent with the present invention may provide unit load tracking and real-time information in support of operations systems such as PostalOne!, Activity Based Costing, and Plant-Verified Drop Shipment (United States Postal System operations systems).

Currently, about one third of First-Class mail service failures result from deliveries that are more than one day late. Systems consistent with the present invention may be able to reduce this percentage by identifying trays that are not moving.

Revenue assurance applications may capture lost revenue by identifying inaccuracies and inefficiencies between external mailing statements and the number of trays, their induction points and times, their required sorting operations, and the quality of the label print. Inspectors and acceptance systems may utilize the information to target due revenue. Other handling and distribution system initiatives may use this new system to fully report tray mail characteristics such as quantity and payment from a mailer, induction time and date, and facility and operation specifics.

FIG. 1 is an illustration of a system consistent with the present invention in its operating environment. A handler 110a in a mail processing facility may utilize a label printer system 105 to generate an enhanced label 120c. Enhanced label 120c may comprise a routing code and a label unique identifier, either as a single concatenated code or as individual codes. Such codes may be in the form of a bar code, with or without a human readable format. Enhanced label 120c is placed onto a tray 125 in order to uniquely identify tray 125. Uniquely identifying tray 125 should not be construed as requiring an absolutely unique identifier for tray 125, but, as is understood by those skilled in the art, as sufficiently unique enough to distinguish tray 125 from other trays within a reasonable time period, e.g., within a one year time frame.

Tray 125 may be, for example, a letter mail tray, a flat tub, or a sack and may hold one or more pieces of mail. Throughout this document the term "mail" should be construed expansively to include all types of shipping, including letters, flat mail, and packages.

Handler 110a may place enhanced label 120c onto tray 125 or label printer system 105 may place enhanced label 120c onto tray 125. Label printer system 105 may be in communication with an Enterprise Host 140 for communication of enhanced label information electronically.

After tray 125 has been labeled and is ready for further processing, for example, shipment from its origin to its destination, tray 125 may be placed within a container 130. Container 130 may contain one or more trays 125. Container 130 also has a unique identifier 132 associated with it. At the time that tray 125 is placed into container 130 or at a later time prior to shipment, enhanced label 120 on the tray 125 may be "scanned" along with container unique identifier 132 by handler 110b. "Scanning" includes, but is not limited to, handler 110b utilizing a scanner 145 to scan the bar codes, or the manual entry of human readable portions of enhanced label 120 and container unique identifier into an input device, such as a computer or Personal Digital Assistant (PDA). Alternatively, "scanning" may also include having scanner 145 mounted for automatic reading of container unique identifier 132 and enhanced label 120c, without the need for manual scanning by handler 110b. "Scanning" may also include other automatic identification and data capture Methodologies, such as those using Radio Frequency Identification (RFID) by itself or in combination with barcode scanning. Scanned information may include, for example, the routing code, the label unique identifier, the container unique identifier, other information on enhanced label 120c or container unique identifier 132, time and date information, operator information, and location information. This scanned information may be transferred to Enterprise Host 140 for storage, thus associating tray 125 having enhanced label 120c with container 130 that has unique identifier 132 associated with it.

As container 130 is loaded onto a distribution vehicle 135, container unique identifier 132 and a unique vehicle code 137 on distribution vehicle 135 may be scanned, for example, by a handler 110c with scanner 145. This scanned information may be transferred to Enterprise Host 140, thus associating container 130 (already associated with tray 125) with distribution vehicle 135. During the period of distribution, other vehicle-to-vehicle transfers may occur, with each transfer potentially accompanied by a scanning event of the container and a unique identifier on the new vehicle, wherein the scanning events may transfer the container unique identifier and associated new unique vehicle identifier to Enterprise Host 140.

At the destination location, handler 110e may scan container 130 and offloading vehicle 135 may be scanned, for example, by a handler 110d to verify and track that the container 130 has been offloaded from vehicle 135. In addition, as tray 125 is removed from container 130, tray 125 and container 130 may be scanned, for example, by handler 110d to verify the removal of tray 125 from container 130.

Through the above process, tracking of trays may be established to accomplish one or more goals or benefits consistent with the present invention.

Figure 2:
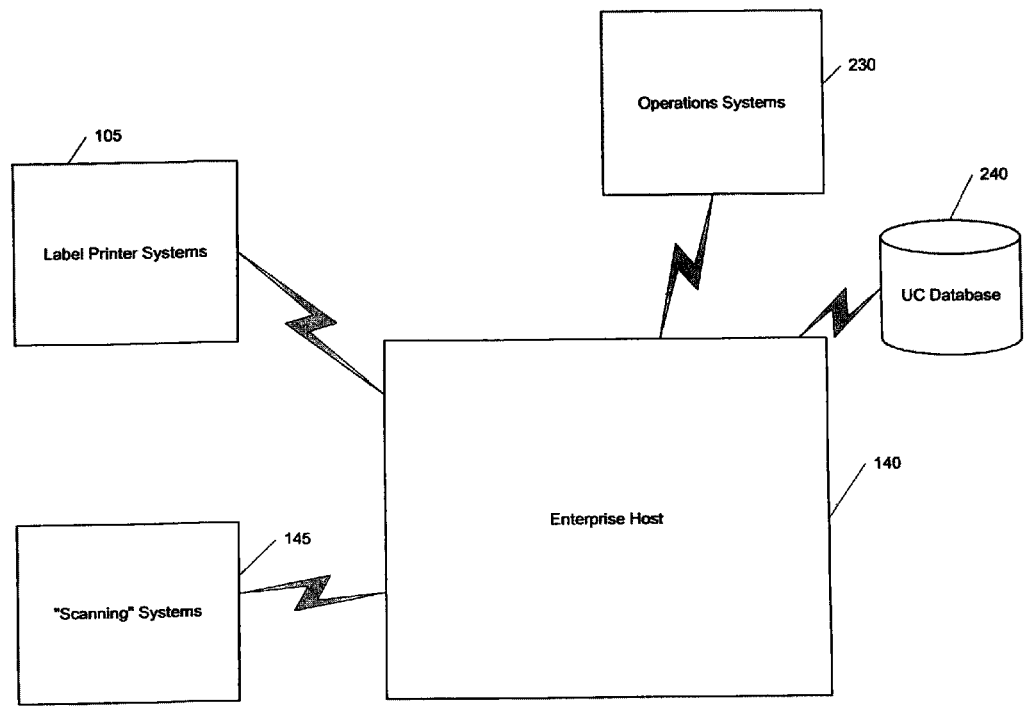
FIG. 2 is a system diagram of components utilized in a universal coding system consistent with the present invention

FIG. 2 is a system diagram of components utilized in a universal coding system consistent with the present invention. Enterprise Host 140 may comprise tracking systems that interface with external systems, such as an operations system 230, label printer system 105, and scanning systems 145, for tracking trays, containers, and vehicles.

Enterprise Host 140 may be coupled to a Universal Coding database 240 ("UC Database") for storing one or more databases containing tray, container, vehicle identifiers and linkages. The electronic record format may comprise the scanned information, date, time, tray weight, facility, operation number, sort plan, and other event-specific data. The electronic file may be used to create a database record of scanned enhanced labels. This information may be compiled nationally in near real-time and may be available locally for flow and trend analysis.

Operations system 230 may comprise back-office systems within the handling and distribution environment for receiving tray-tracking information from Enterprise Host 140 and providing numerous financial, tracking, planning, operating, and maintenance functions that may benefit from tray tracking information.

Scanning systems 145 may be located at drop-shipment (or mailer drop off) facilities, delivery facilities, and throughout the in-process mail handling systems to scan trays, containers, and vehicles for uploading tracking information to Enterprise Host 140. Scanning systems 145 may be scanners, such as bar code or RF scanners, for reading container unique identifiers from containers holding trays or for reading enhanced labels from trays, or they may be any other apparatus known to those skilled in the art for identifying an identifier on a shipping item. Scanning systems 145 may include human entry systems for receiving human input of human-readable information from enhanced labels or containers.

Label printer systems 105 may include processor systems coupled to label printers. Label printer systems 105 may be configured to generate enhanced labels comprising routing code and unique identifiers.

Figure 3:
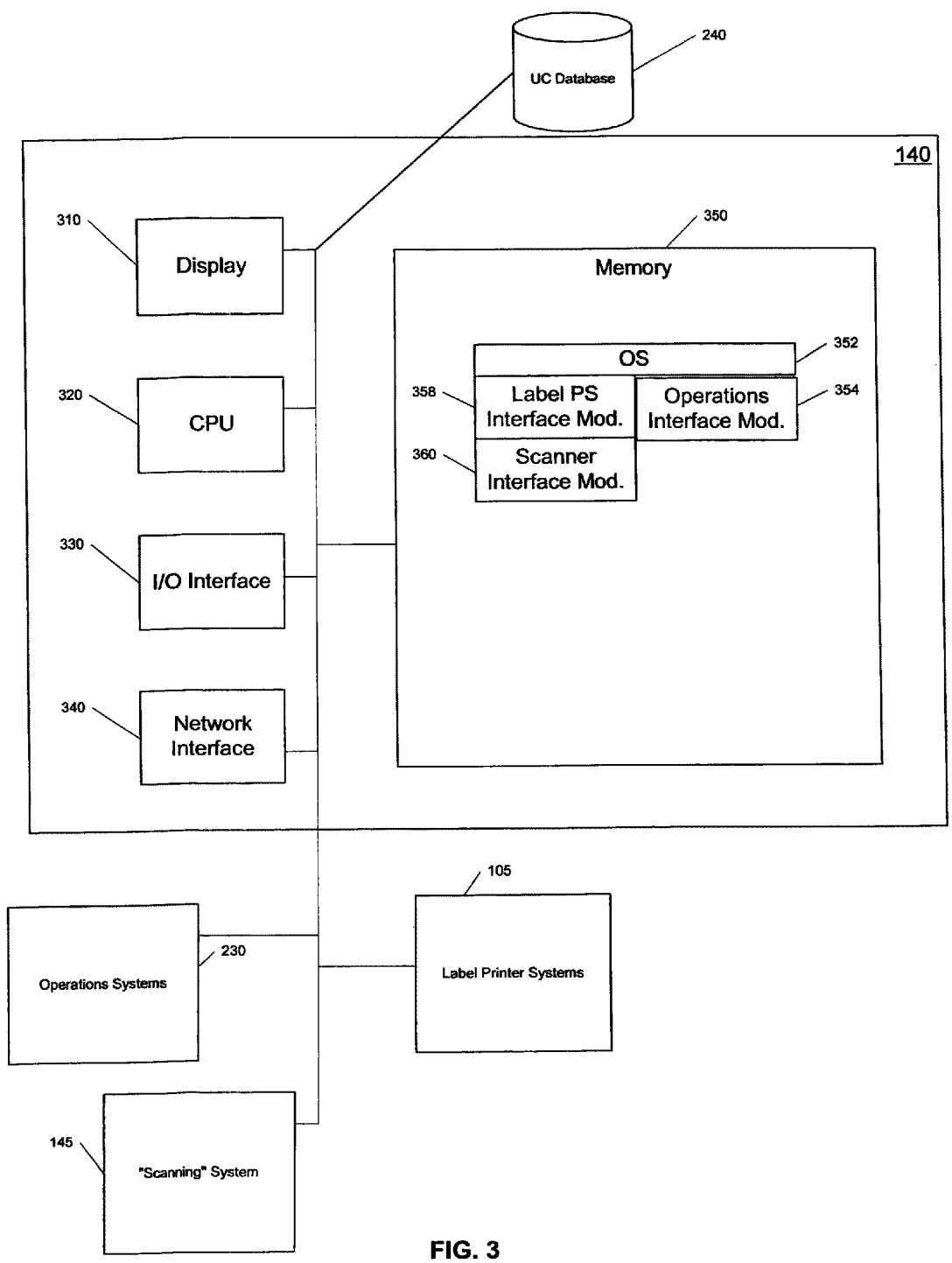
FIG. 3 is a block diagram of an Enterprise Host 140 consistent with the present invention.

FIG. 3 is a block diagram of an Enterprise Host 140 consistent with the present invention. As illustrated in FIG. 3, a system environment of an Enterprise Host 140 may include one or more of the following: a display 310, a central processing unit 320, an input/output interface 330, a network interface 340, and memory 350 coupled together by a communications bus. Enterprise Host 140 is adapted to include the functionality and computing capabilities to implement the described tracking functions of Enterprise Host 140 and to access, read from, and write to UC database 240. The input, output, and monitoring of the system may be provided on display 310 for viewing.

As shown in FIG. 3, Enterprise Host 140 may comprise a PC or mainframe computer for performing various functions and operations consistent with the invention. Enterprise Host 140 may be implemented, for example, by a general purpose computer selectively activated or reconfigured by a computer program stored in the computer, or may be a specially constructed computing platform for carrying-out the features and operations of the present invention. Enterprise Host 140 may also communicate or transfer tray information, container information, vehicle information, and tracking information via I/O interface 330 and/or network interface 340 through the use of direct connections or communication links to other elements of the present invention. For example, a firewall in network interface 340, prevents access to the platform by unpermitted outside sources.

Alternatively, communication within Enterprise Host 140 can be achieved through the use of a network architecture (not shown). In the alternative embodiment (not shown), the network architecture may comprise, alone or in any suitable combination, a telephone-based network (such as a PBX or POTS), a Local Area Network (LAN), a Wide Area Network (WAN), a dedicated intranet, and/or the Internet. Further, it may comprise any suitable combination of wired and/or wireless components and systems. By using dedicated communication links or shared network architecture, Enterprise Host 140 may be located in the same location or at a geographically distant location from systems 105, 145, 230, and 240.

I/O interface 330 of the system environment shown in FIG. 3 may be implemented with a wide variety of devices to receive and/or provide the data to and from Enterprise Host 140. I/O interface 330 may include an input device, a storage device, and/or a network. The input device may include a keyboard, a mouse, a disk drive, video camera, magnetic card reader, or any other suitable input device for providing data to Enterprise Host 140.

Network interface 340 may be connected to a network, such as a WAN, a LAN, or the Internet for providing read/write access to records.

Memory device 350 may be implemented with various forms of memory or storage devices, such as Read-Only Memory (ROM) devices and Random Access Memory (RAM) devices. Memory device 350 may also include a memory tape or disk drive for reading and providing records on a storage tape or disk as input to Enterprise Host 140. Memory device 350 may comprise computer instructions forming: an operating system 352; an Operations Interface Module 354 for reading, writing, and updating tracking information to the Operations System 230; a label printer system interface module 358 for reading and writing label information regarding enhanced labels from label printer systems 105; and a Scanner Interface Module 360 for receiving scanning information from scanners 145.

Figure 4:
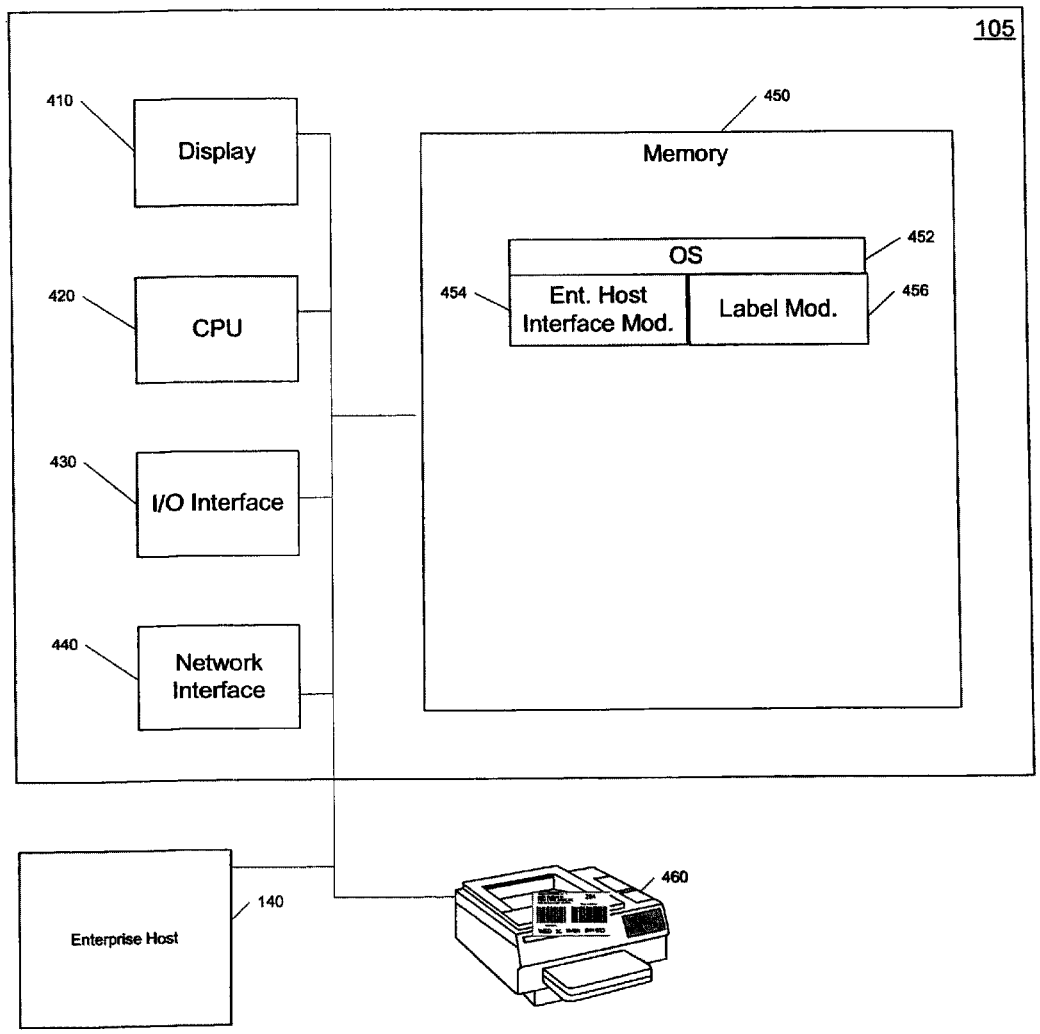
FIG. 4 is a block diagram of a Label Printer System 105 consistent with the present invention.

FIG. 4 is a block diagram of a label printer system 105 consistent with the present invention. As illustrated in FIG. 4, a system environment of label printer system 105 may include a display 410, a central processing unit 420, an input/output interface 430, a network interface 440 and memory 450 coupled together by a bus. Label printer system 105 is adapted to include the functionality and computing capabilities receive data such as routing and identifier data from host 140, to create enhanced labels with a unique identifier, and to send enhanced label information to Enterprise Host 140. Alternatively, label printer system 105 may generate routing and unique identifier data locally. Label printer system 105 may operate within the delivery system or be located at a mailer's location. In addition, mailers may utilize a PC with connected web browser and printer to effectuate the functions of label printer system 105. The input, output, and monitoring of the system may be provided on display 410 for viewing.

Alternatively, communication within label printer system 105 can be achieved through the use of a network architecture (not shown). In the alternative embodiment (not shown), the network architecture may comprise, alone or in any suitable combination, a telephone-based network (such as a PBX or POTS), a Local Area Network (LAN), a Wide Area Network (WAN), a dedicated intranet, and/or the Internet. Further, it may comprise any suitable combination of wired and/or wireless components and systems. By using dedicated communication links or shared network architecture, label printer system 105 may be located in the same location or at a geographically distant location from Enterprise Host 140.

I/O interface 430 of the system environment shown in FIG. 4 may be implemented with a wide variety of devices to receive and/or provide the data to and from label printer system 105. I/O interface 430 may include an input device, a storage device, and/or a network. The input device may include a keyboard, a mouse, a disk drive, video camera, magnetic card reader, or any other suitable input device for providing data to label printer system 105.

Network interface 440 may be connected to a network, such as a Wide Area Network (WAN), a Local Area Network (LAN), or the Internet for providing read/write access to records.

Memory device 450 may be implemented with various forms of memory or storage devices, such as read-only memory (ROM) devices and random access memory (RAM) devices. Memory device 450 may also include a memory tape or disk drive for reading and providing records on a storage tape or disk as input to label printer system 105. Memory device 450 may comprise computer instructions forming: an operating system 452 and an Enterprise Host Interface Module 454. Module 454 may process data received from Enterprise Host 140 and to upload enhanced label information to Enterprise Host 140.

Figure 5:
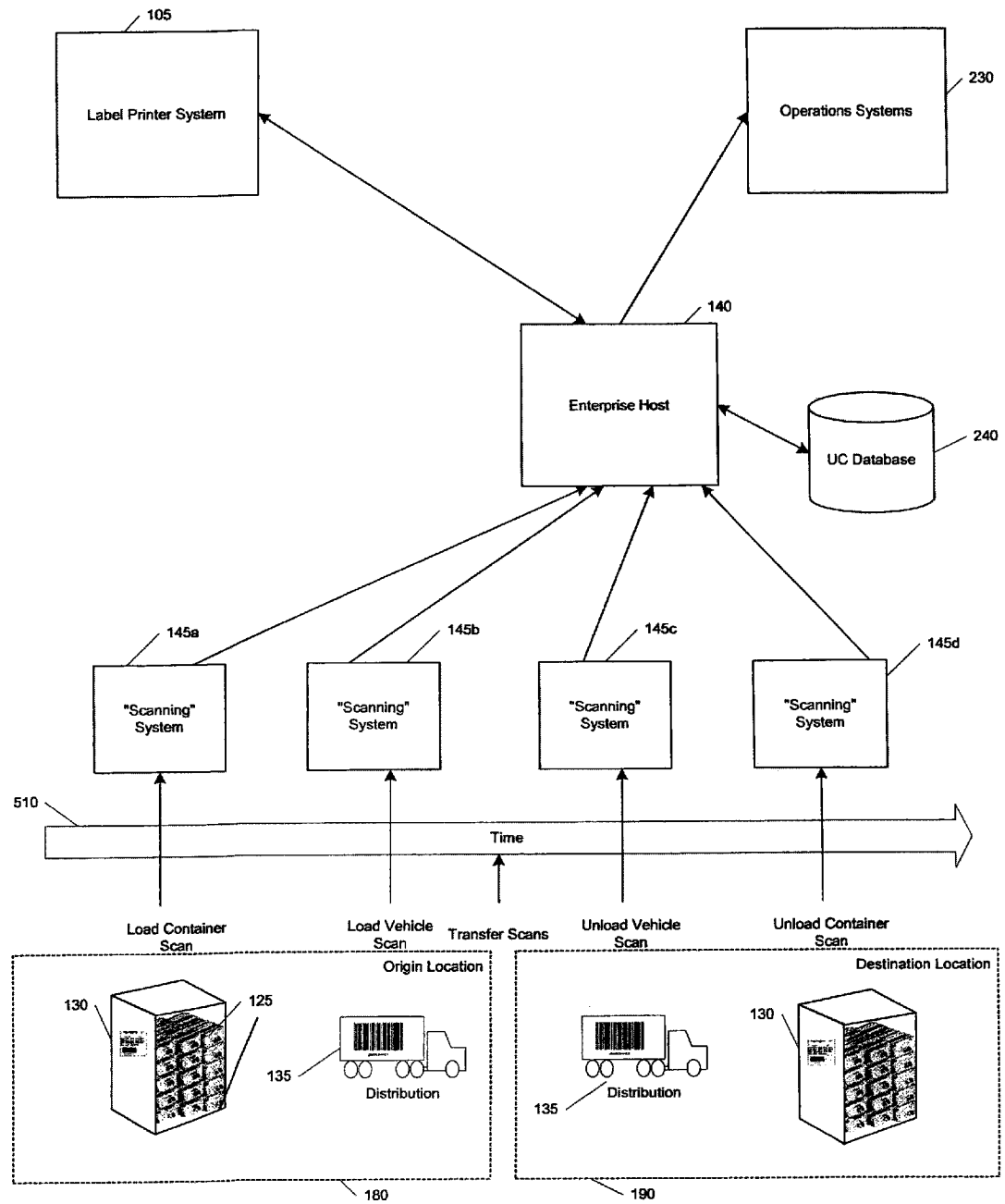
FIG. 5 is a process flow diagram consistent with the present invention.

FIG. 5 is a process flow diagram consistent with the present invention. Label printer system 105 may be utilized to generate an enhanced label, comprising a routing code and a unique identifier. Information from the enhanced label may be sent to Enterprise Host 140 for storage in UC Database 240. The enhanced label is placed on a tray, which is then placed within a container. The container also has a container unique identifier, which may be in bar code format, on the container.

One or more scanning systems 145*a*, 145*b*, 145*c*, and 145*d* may be in communication with Enterprise Host 140, transferring scanned enhanced label information from trays, container unique identifiers and/or vehicle unique identifier information to Enterprise Host 140 for storage in UC Database 240. As previously described, when trays are placed within containers, scanning of the trays and containers by a scanning device associates a tray to a container, with the association transferred to Enterprise Host 140. As containers are placed on and off vehicles, containers and vehicles are scanned to associate containers with vehicles, thus informing Enterprise Host 140 of the location of trays and containers.

Enterprise Host 140 may provide this stored scanned association information to operations system 230 for tracking, maintenance, and financial uses by the systems.

Timeline 510 represents the progress of tray 125 within container 130 through the delivery system. At an origination location 180, scanning system 145*a* may scan the enhanced label from tray 125 and a container unique identifier from container 130 into Enterprise Host 140. Location 180 may be a facility of the shipping service provider or a facility of a customer generating a high volume of shipping items. Enterprise Host 140 may associate tray 125 with container 130 and store this association, along with other scanning information, such as time, date, and location, in UC Database 240. Enterprise Host 140 may also notify operations systems 230 of the actual induction of the tray, so that operations systems 230 may plan for processing the tray and container. In addition, Enterprise Host 140 may procure payment from a mailer at the time of this containerization scan.

As container 130 is placed onto vehicle 135, scanning system 145*b* may scan the container and the vehicle and upload the container unique identifier and the vehicle unique identifier to Enterprise Host 140 for storage in UC Database 240. Through this, Enterprise Host 140, which already has access to a database of trays within container 130, can easily determine which vehicle 135 holds container 130.

As container 130 travels through the delivery system, one or more scanning systems (not shown) may take in-process scans of the container 130 as it undergoes one or more vehicle-to-vehicle transfers. Information from these scans may be uploaded to Enterprise Host 140 for transmission to operations system 230 and storage in UC Database 240. As container 130 reaches its destination 190, scanning system 145*c* may scan container 130 as it is removed from vehicle 135, uploading the scanning information to Enterprise Host 140 and UC Database 240.

Lastly, as tray 125 is removed from container 130, scanning system 145*d* scans and uploads information from the enhanced label of tray 125 and the unique container identifier of container 130 to Enterprise Host 140 and UC Database 240. In this fashion, systematic tracking and tracing information may be stored in UC Database 240 for various uses.

Figure 6:
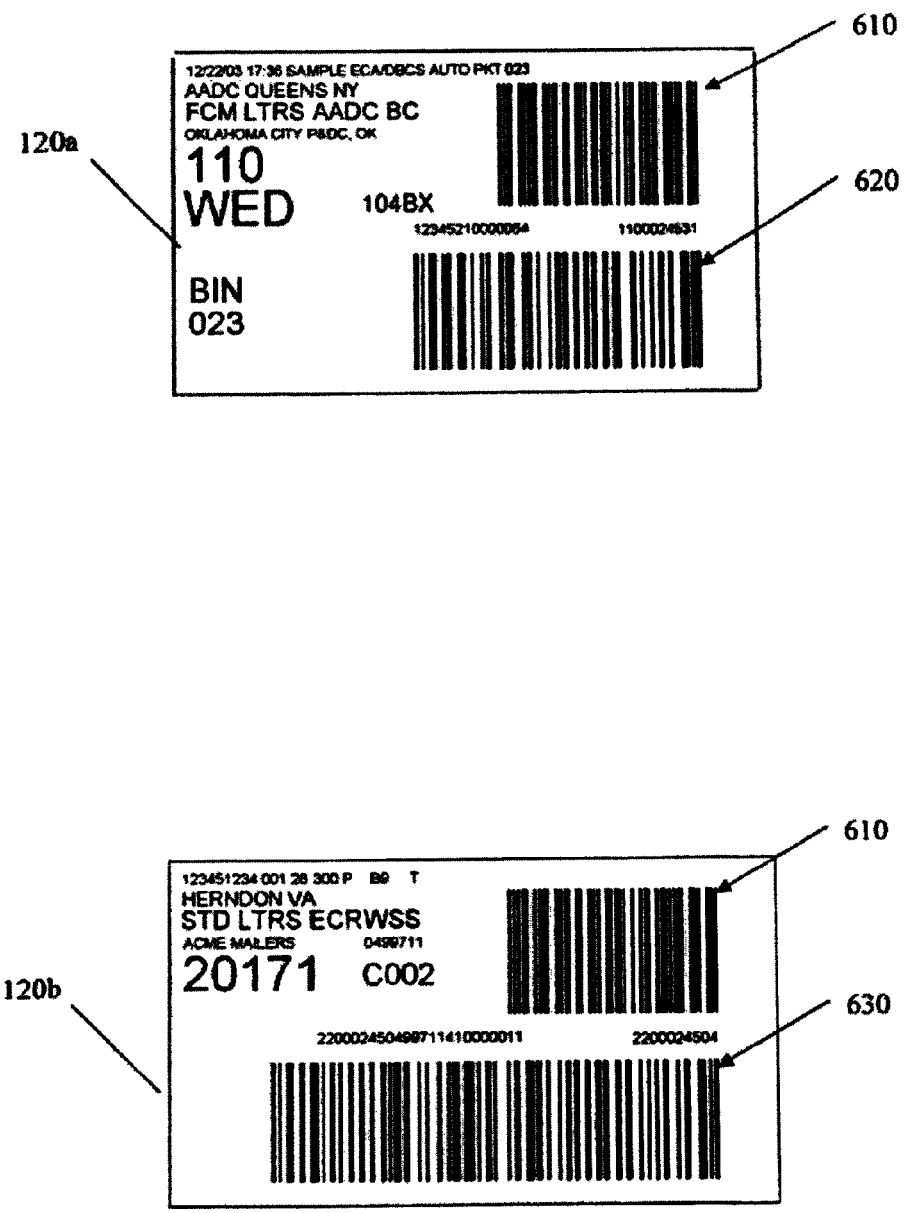
FIG. 6 shows enhanced labels 120a and 120b consistent with the present invention.

FIG. 6 shows embodiments of enhanced labels 120*a* and 120*b* consistent with the present invention. Enhanced label 120*a* comprises a ten-digit routing bar code 610 and a fourteen-digit label unique identifier bar code 620. In the case of enhanced label 120*b*, the ten-digit routing code and the fourteen-digit label container unique identifier concatenates into a single twenty-four digit identifier 630. Consistent with the present invention, other information in human and/or machine-readable form may also be present on enhanced label 120.

Figure 7:
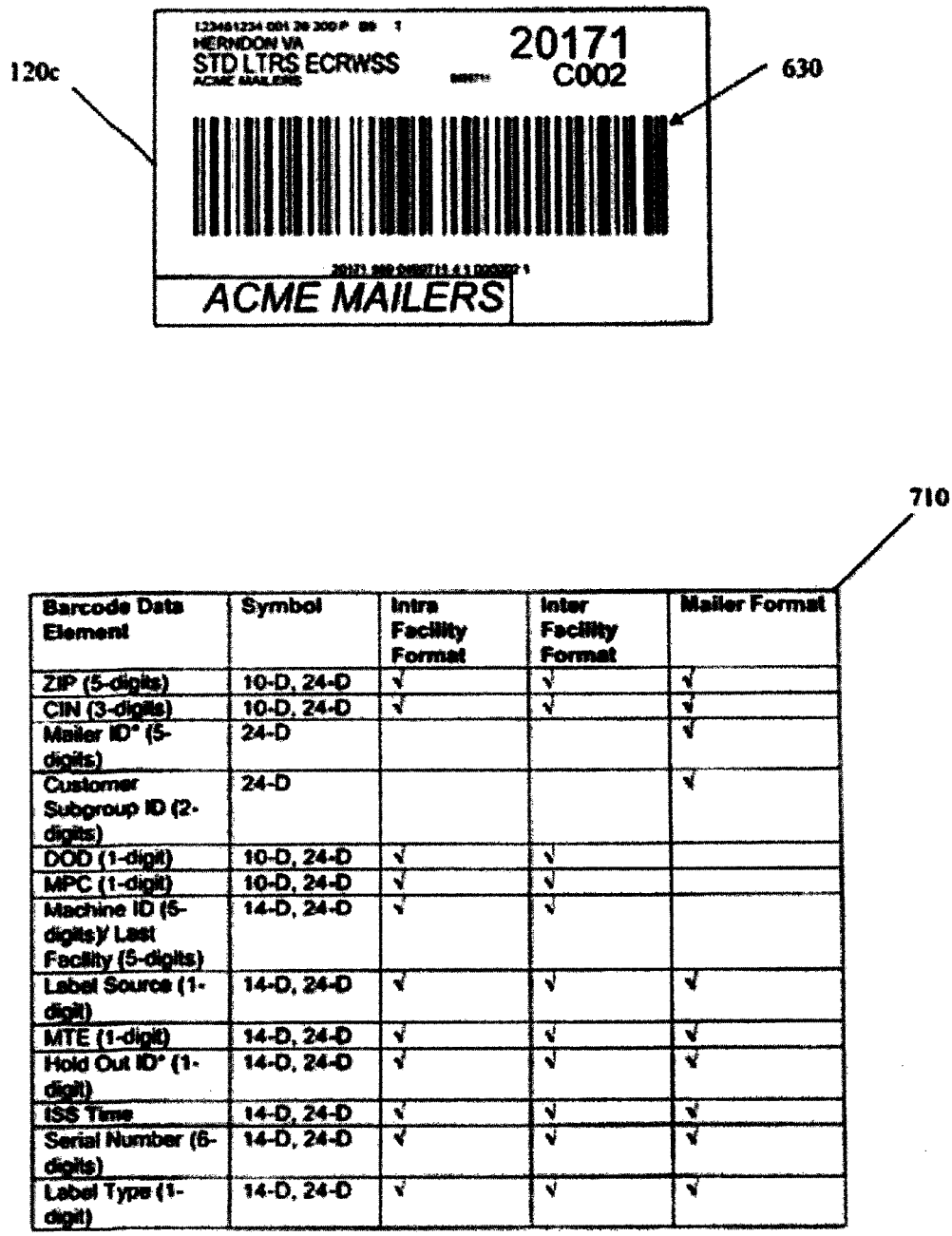
FIG. 7 shows enhanced label 120c and provides additional details of enhanced labels 120a and 120b consistent with the present invention.

FIG. 7 provides additional details of enhanced labels 120*a* and 120*b* and presents enhanced label 120*c* that bears only the single twenty-four digit identifier 630 consistent with the present invention. Chart 710 discloses the format and content of the ten-digit routing code 610, the fourteen-digit label unique identifier 620 and the twenty-four digit label unique identifier. The first five digits of routing code 610 may comprise a five-digit destination ZIP code. The next three digits of routing code 610 may comprise a three-digit ON (Content Identifier Number) code, which is a code describing the tray contents. The next digit of the routing code 610 is the Day of Delivery ("DOD") code, and the last digit is the Mail Processing Code ("MPC").

The fourteen-digit label unique identifier 620 comprises, first, a five-digit machine identifier. The machine identifier identifies the machine or the facility that generated the mail tray and may remain constant for every mail tray prepared by that machine for a single operation. A non-varying machine identifier may be useful for quality control. The machine identifier element of a Delivery Unit to Plant Operations may also remain constant for every mail tray prepared in the facility.

Next, label unique identifier 620 comprises a label source digit which identifies the internal delivery system which printed enhanced label 120*a*. This may assist in diagnosing quality control issues. In a case where a batch of enhanced labels 120 are unable to be read by automated barcode readers, the delivery system may benefit from having the capability to ascertain the location which printed the label and by what equipment. The label source may indicate whether the label was printed within the delivery system. Therefore, the label source for each batch of labels may remain constant, along with the Mail Transport Equipment (MTE), the next digit in label unique identifier 620. The MTE indicates the type of container to which the enhanced distribution unique label belongs.

Next, a six-digit field is available in label unique identifier 620 to assign a serial number to enhanced label 120. When combined with routing code 610, the key fields for creating enhanced label 120 are the ZIP Code, CIN, Mailer ID, Customer Subgroup ID (Mailer and Customer Subgroup ID only applicable with certain mail flow processes), and Serial Number. The multiple variations of these fields provide both mailers and postal handlers a multitude of combinations to use. In the case that the destination ZIP Code, CIN (the tray contents descriptor code) and, Customer Subgroup remain the same, mailers have 1 million number combinations when keeping the Serial Number unique.

Figure 8:
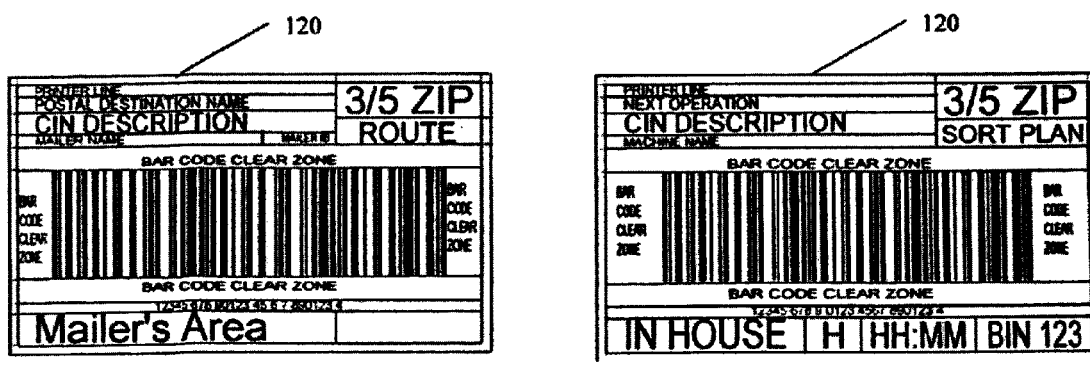
FIG. 8 shows further details of enhanced label 120 process flows consistent with the present invention.

Next, and last, in the label unique identifier 620 is the label type. The label type may be a fixed numeric value of 2-6 to identify the mail flow process between origin and destination (as depicted in FIG. 8, Table 810). Each label type numeric value identifies a specific process flow. The label type may not vary from label to label. However, the label type may vary from process flow to process flow. In order to distinguish one process flow from another via enhanced labels 120, each process flow may use a constant element exclusive to the type of flow.

Unique identifier 630 concatenates the variables defined above for ten-digit routing code 610 and fourteen-digit label unique identifier 620. However, depending on the particular label type selected certain of the variables may vary depending on the mail flow process which is being represented. For certain mail flow processes, for example, a mailer to postal mail flow, the machine identifier may not be applicable. The mailer would be uniquely identified in order to identify the specific mailer from whom the mail is originating. With such mail flows, unique identifier 620 may not be valid when used on the combined enhanced label, 120*a*. Unique identifier 630, the single twenty-four digit identifier, can use values that represent a Mailer ID and a Customer Subgroup ID to replace the DOD and the MPC in ten-digit routing code, 610, and the Machine ID in fourteen-digit unique identifier 620.

The key fields, as mentioned above, provide mailers with additional combinations of unique numbers. These elements are useful because they generally do not remain constant, but change based on the tray's content and destination. For example, if a mailer is sending trays to one hundred different ZIP Codes, then the mailer has 100 million unique number combinations available with the ZIP and 6-digit Serial Number changes, keeping all other data elements constant. The CIN provides the same variability as the ZIP code. If a customer is mailing two content types using two CIN numbers the customer has 2 million unique combinations without altering the ZIP Code.

FIG. 8 shows further details of an enhanced label 120 consistent with the present invention. Table 810 illustrates the data elements of enhanced label 120, specifically the concatenated routing code and unique identifier, in certain typical process flows. These are merely illustrative and show the options available to users of systems consistent with the present invention. Depending on the specific process flow some of the values of the variables defined for label unique identifier 620 and 630 may vary as illustrated.

Further samples of enhanced labels are shown in 820 and 830.

Figure 9:
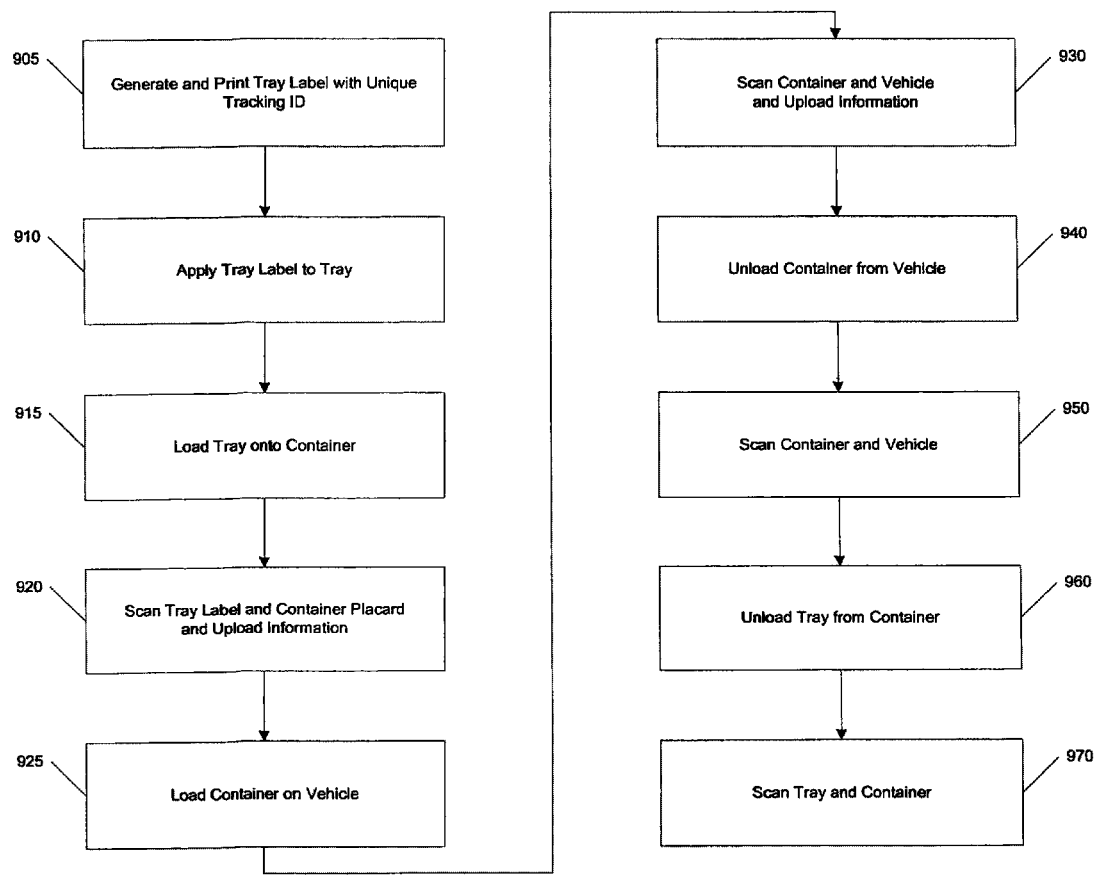
FIG. 9 is a flowchart of a universal coding system consistent with the present invention.

FIG. 9 is a flowchart of a universal coding method consistent with the present invention. At stage 905, the enhanced label is generated, where the enhanced label includes a unique identifier. At stage 910, the enhanced label is applied to the tray. At stage 915, the tray is loaded into a container. At stage 920, the enhanced label on the tray and the container unique identifier are scanned, with the scanned information being stored in a central database. At stage 925, the container is loaded onto a vehicle marked with a vehicle unique identifier.

At stage 930, the container and vehicle are scanned. The container unique identifier and vehicle unique identifier may be passed for storage to a central database. At stage 940, the container is unloaded from the vehicle. Of course, prior to this stage other vehicle-to-vehicle transfers of the container may have occurred with corresponding scans performed. At stage 950, the container and vehicle are scanned to confirm that the container has been removed from the vehicle. This scanned information is passed to the central database. At stage 960, the tray is unloaded from the container. At stage 970, the tray and container are scanned, with this scanned information being passed to the central database.

Figure 10:
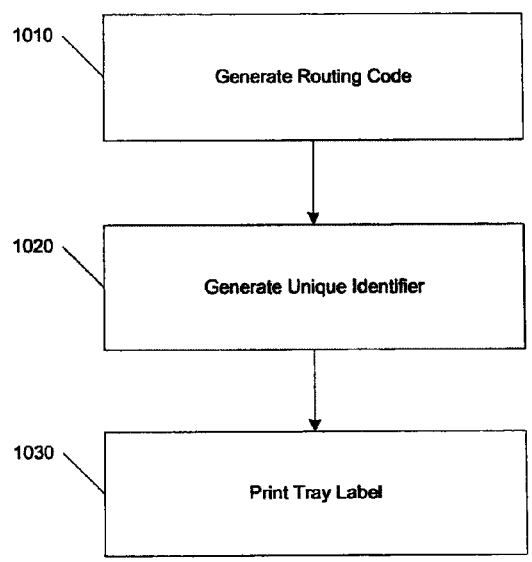
FIG. 10 is a detailed flowchart of the code generation process 905 consistent with the present invention.

FIG. 10 is a detailed flowchart of the code generation process 905 consistent with the present invention. At stage 1010, the routing code is generated as described previously with respect to FIG. 7. At stage 1020, the unique identifier is generated as described with respect to FIG. 7. At stage 1030, the enhanced label is printed for later application to the tray. While FIG. 10 denotes a serialized operation of the process, those skilled in the art will appreciate that the process need not be done in a serial fashion and may be performed through a combination of parallel and serial operations. Requirements for generating the routing code and unique identifier are further defined with respect to FIG. 11.

Figure 11:
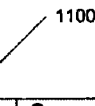
FIG. 11 is a table 1100 illustrating the constant, key, and variable barcode data elements for each of the label types in table 810 of FIG. 8 consistent with the present invention.

FIG. 11 is a table 1100 illustrating exemplary constant, key, and variable barcode data elements for each of the label types in table 810 of FIG. 8 consistent with the present invention. Each label 120 provides a concatenated routing code and unique identifier in the barcode for a specific timeframe for each label type, as illustrated in table 810 of FIG. 8. Consistent with the present invention, a serialization strategy is provided to define how each of the label types of table 810 provides uniqueness. For each label type of table 810, uniqueness may be defined in terms of constant, key, and variable fields in the barcode. Constant fields are those that stay the same due to, for example, the origin of the mail or the source of the tray label. Key fields are fields that vary, but are not at the control of the originator. Thus, key fields may be used to ensure uniqueness. Variable fields are fields where the originator of the mail may exercise control and may be considered the most effective means of guaranteeing uniqueness.

The printing system of the present invention does not need to utilize the key fields in generating unique labels for trays and sacks. For example, in a situation with a 30 day uniqueness requirement, if a mailer having its own 7-digit Mailer ID only generates 100,000 trays per month, the mailer only needs to increment the variable Serial Number field for each successive label. If, however, the mailer generates 1,800,000 trays using various ZIPs and CINs, the mailer's printing system could choose to track the changes in CIN or ZIP key fields in determining when it may need to increment the variable Serial Number field. Once the length of uniqueness is defined, maintaining uniqueness of the tray identifier for its entire life may be accomplished through serialization management.

Those skilled in the art will appreciate that all or part of systems and methods consistent with the present invention may be stored on or read from other computer-readable media, such as: secondary storage devices, like hard disks, floppy disks, and CD-ROM; a carrier wave received from the Internet; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed just for this purpose.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A computer-implemented method of tracking a tray of items, comprising:
   receiving, from a scanner, load container data, the load container data associating an enhanced label and a container unique identifier,
   printing, via a printer, the enhanced label,
   applying the enhanced label to the tray,
   the enhanced label scanned from the tray, the enhanced label comprising a routing code and a label unique identifier, the tray being uniquely identified by a combination of the routing code and the label unique identifier, and
   the container unique identifier scanned from a label attached to a container; and
   associating, based on the load container data, the tray with the container.

2. The method of claim 1, wherein the items comprise mail items.

3. The method of claim 1, wherein the tray is located within the container.

4. The method of claim 1, further comprising:
   receiving load vehicle data comprising the container unique identifier and a vehicle unique identifier, the vehicle unique identifier scanned from a vehicle; and
   associating, based on the load vehicle data, the container with the vehicle.

5. The method of claim 4, wherein the container is located within the vehicle.

6. The method of 4, further comprising:
   receiving unload vehicle data comprising the container unique identifier and the vehicle unique identifier; and
   determining, based on the unload vehicle data, that the container has been removed from the vehicle.

7. The method of claim 1, further comprising:
   receiving unload container data comprising the label unique identifier and the container unique identifier; and
   determining, based on the unload container data, that the tray has been removed from the container.

8. The method of claim 1, wherein the load container data further comprises a load container time.

9. The method of claim 1, wherein the load container data further comprises a load container location.

10. A non-transitory computer-readable medium on which is stored a set of instructions for tracking a tray of items, which when executed performs stages comprising:
    receiving, from a scanner, load container data, the load container data associating an enhanced label and a container unique identifier,
    printing, via a printer, the enhanced label;
    applying the enhanced label to the tray,
    the enhanced label scanned from the tray, the enhanced label comprising a routing code and a label unique identifier, the tray being uniquely identified by a combination of the routing code and the label unique identifier, and
    the container unique identifier scanned from a label attached to a container; and
    associating, based on the load container data, the tray with the container.

11. The non-transitory computer-readable medium of claim 10, wherein the items comprise mail items.

12. The non-transitory computer-readable medium of claim 10, wherein the tray is located within the container.

13. The non-transitory computer-readable medium of claim 10, further comprising instructions for:
    receiving load vehicle data comprising the container unique identifier and a vehicle unique identifier, the vehicle unique identifier scanned from a vehicle; and
    associating, based on the load vehicle data, the container with the vehicle.

14. The non-transitory computer-readable medium of claim 13, wherein the container is located within the vehicle.

15. The non-transitory computer-readable medium of 13, further comprising instructions for:
    receiving unload vehicle data comprising the container unique identifier and the vehicle unique identifier; and
    determining, based on the unload vehicle data, that the container has been removed from the vehicle.

16. The non-transitory computer-readable medium of claim 10, further comprising instructions for:
    receiving unload container data comprising the label unique identifier and the container unique identifier; and
    determining, based on the unload container data, that the tray has been removed from the container.

17. The non-transitory computer-readable medium of claim 10, wherein the load container data further comprises a load container time.

18. The non-transitory computer-readable medium of claim 10, wherein the load container data further comprises a load container location.

19. A system for tracking a tray of items, comprising:
    a memory;
    a database;
    a printer;
    the printer configured to print an enhanced attachable label;
    a processor, coupled to the memory and the database, the processor configured to:
    receive, from a scanner, load container data, the load container data associating an enhanced label and a container unique identifier,
    the attached enhanced label scanned from the tray, the enhanced label comprising a routing code and a label unique identifier, the tray being uniquely identified by a combination of the routing code and the label unique identifier, and
    the container unique identifier scanned from a label attached to a container; and
    associating, based on the load container data, the tray with the container.

* * * * *